United States Patent
Singh et al.

(10) Patent No.: US 12,499,102 B2
(45) Date of Patent: Dec. 16, 2025

(54) HIERARCHICAL DELIMITER IDENTIFICATION FOR PARSING OF RAW DATA

(71) Applicant: UnitedHealth Group Incorporated, Minnetonka, MN (US)

(72) Inventors: Sanjay Kumar Singh, Bengaluru (IN); Subhasis Jethy, Bangalore (IN); Udit Saini, Haridwar (IN); Ranju Das, Seattle, WA (US); Vasant Manohar, Bothell, WA (US); Rahul Bhotika, Bellevue, WA (US); Carlos Morato, Sammamish, WA (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 0 days.

(21) Appl. No.: 18/218,986

(22) Filed: Jul. 6, 2023

(65) Prior Publication Data
US 2025/0013621 A1 Jan. 9, 2025

(51) Int. Cl.
G06F 16/00 (2019.01)
G06F 16/22 (2019.01)
G06F 16/23 (2019.01)

(52) U.S. Cl.
CPC ...... *G06F 16/2282* (2019.01); *G06F 16/2365* (2019.01)

(58) Field of Classification Search
CPC .......... G06F 16/2282; G06F 16/2365
(Continued)

(56) References Cited

U.S. PATENT DOCUMENTS 7,054,871 B2 5/2006 Hu et al.
7,509,574 B2 3/2009 Kamiya
(Continued)

FOREIGN PATENT DOCUMENTS

JP 2010182082 A * 8/2010

OTHER PUBLICATIONS

Embley et al., "Table-processing paradigms: a research survey", International Journal of Document Analysis and Recognition, Springer, May 9, 2006, pp. 66-86, URL: https://sites.ecse.rpi.edu/~nagy/PDF_files/Embley_Hurst_Lopresti_Nagy_tablesurvey.pdf.
(Continued)

*Primary Examiner* — Charles Rones
*Assistant Examiner* — Shirley D Hicks
(74) *Attorney, Agent, or Firm* — Shumaker & Sieffert, P.A.

(57) ABSTRACT

An example system for parsing and transforming input data that includes processing circuitry and memory, the memory configured to store the input data. The processing circuitry is configured to determine a first delimiter in the input data. The processing circuitry is configured to determine a plurality of second delimiter hypotheses and parse the input data according to the first delimiter and the plurality of second delimiter hypotheses to generate a plurality of tables that are each associated with a respective one of the plurality of second delimiter hypotheses. The processing circuitry is configured to determine a respective consistency score for each of the plurality of tables and select a table from among the plurality of tables based on the respective consistency score associated with the table. The processing circuitry is configured to format the input data based on the selected table to generate formatted data and output the formatted data.

20 Claims, 8 Drawing Sheets

(58) Field of Classification Search
USPC .................................................. 707/600–899
See application file for complete search history.

(56) References Cited

U.S. PATENT DOCUMENTS

| | | | |
|---|---|---|---|
| 8,707,166 | B2 | 4/2014 | Wagner et al. |
| 9,207,829 | B2 | 12/2015 | Hsieh et al. |
| 10,204,119 | B1 | 2/2019 | Ackner et al. |
| 10,242,016 | B2 | 3/2019 | Gorelik |
| 10,878,195 | B2 | 12/2020 | Duta |
| 10,942,943 | B2 | 3/2021 | Thomas et al. |
| 2018/0046656 | A1 | 2/2018 | Woulfe et al. |
| 2020/0159704 | A1* | 5/2020 | Ackner ............... G06F 40/205 |
| 2020/0364451 | A1 | 11/2020 | Ammar et al. |
| 2022/0365916 | A1 | 11/2022 | Nourbakhsh et al. |
| 2024/0220726 | A1* | 7/2024 | Zhang ................. G06F 16/84 |

OTHER PUBLICATIONS

Saurav et al., "A Machine-Learning Approach to Automatic Detection of Delimiters in Tabular Data Files", IEEE, Dec. 1, 2016, pp. 1501-1503, URL: https://ieeexplore.ieee.org/abstract/document/7828554.

The Apache Software Foundation, "Apache Tika—a content analysis toolkit", 2023, 12 pp., Retrieved from the Internet on Sep. 8, 2023 from URL: https://tika.apache.org/.

Zanibbi et al., "A Survey of Table Recognition: Models, Observations, Transformations, and Inferences", Document Analysis and Recognition, Springer, Oct. 24, 2003, 33 pp., URL: https://research.cs.queensu.ca/home/cordy/Papers/IJDAR_Tables.pdf.

* cited by examiner

INPUT STRING 300

A|Fahrenheit,B;MON,JAN 12;6,40\n 100|C;FRI,MAR 21;8,23\n23|C,8;SUN,SEP 17;71,2\n538|F,0;;8,7\n"N/A"|Celsius;WED,OCT 2;6,93

ARRANGED STRING 302

A|Fahrenheit,B;MON,JAN 12;6,40
100|C;FRI,MAR 21;8,23
23|C,8;SUN,SEP 17;71,2
538|F,0;;8,7
"N/A"|Celsius;WED,OCT 2;6,93

FREQUENCY OF CHARACTERS 304

| Character | Frequency |
|---|---|
| , | 12 |
| ; | 10 |
| \| | 5 |

Used "|" as a delimiter — 310

| A | Fahrenheit,B;MON,JAN 12;6,40 |
|---|---|
| 100 | C;FRI,MAR 21;8,23 |
| 23 | C,8;SUN,SEP 17;71,2 |
| 538 | F,0;;8,7 |
| "N/A" | Celsius;WED,OCT 2;6,93 |

Used "," as a delimiter — 312

| A|Fahrenheit | B;MON | JAN 12;6 | 40 |
|---|---|---|---|
| 100|C;FRI | MAR 21;8 | 23 | |
| 23|C | 8;SUN | SEP 17;7 | 2 |
| 538|F | 0;;8 | 7 | |
| "N/A"|Celsius;WED | OCT 2;6 | 93 | |

Pattern 1 = 4 columns — 314

| A|Fahrenheit,B | MON,JAN 12 | 6 | 40 |
|---|---|---|---|
| 100|C | FRI,MAR 21 | 8 | 23 |
| 23|C,8 | SUN,SEP 17 | 71 | 2 |
| 538|F,0 | ; | 8 | 7 |
| "N/A"|Celsius | WED,OCT 2 | 6 | 93 |

Used "|" as a delimiter — 320

| A | Fahrenheit,B;MON,JAN 12;6,40 |
|---|---|
| 100 | C;FRI,MAR 21;8,23 |
| 23 | C,8;SUN,SEP 17;71,2 |
| 538 | F,0;;8,7 |
| "N/A" | Celsius;WED,OCT 2;6,93 |

Used "," as a delimiter — 322

| A|Fahrenheit | B;MON | JAN 12;6 | 40 |
|---|---|---|---|
| 100|C;FRI | MAR 21;8 | 23 | |
| 23|C | 8;SUN | SEP 17;7 | 2 |
| 538|F | 0;;8 | 7 | |
| "N/A"|Celsius;WED | OCT 2;6 | 93 | |

Pattern 2 = 3 columns — 324

| 100|C;FRI | MAR 21;8 | 23 |
|---|---|---|
| 538|F | 0;;8 | 7 |
| "N/A"|Celsius;WED | OCT 2;6 | 93 |

Pattern 1 — 326

| A|Fahrenheit,B | MON,JAN 12 | 6 | 40 |
|---|---|---|---|
| 100|C | FRI,MAR 21 | 8 | 23 |
| 23|C,8 | SUN,SEP 17 | 71 | 2 |
| 538|F,0 | ; | 8 | 7 |
| "N/A"|Celsius | WED,OCT 2 | 6 | 93 |

330
- Total count of pattern identified = 1
- Number of tuples found = 3 [{:,;}, {:,;}, {:,;}]
- Number of delimiters per pattern = 1
- Number of columns created = 2
- Total nonempty cells count = 10

332
- Total count of pattern identified = 2
- Number of tuples found = 2 [{|,;}, 4[{|},{|},{|,;}]
- Number of delimiters per pattern = 3,2
- Number of columns created = 4, 3
- Total nonempty cells count = 17

334
- Total count of pattern identified = 1
- Number of tuples found = 3 [{|},{,},{|}]
- Number of delimiters per pattern = 2
- Number of columns created = 3,
- Total nonempty cells count = 1

FIG. 3

- Total count of pattern identified = 1 = $k$
- Number of tuples found = 3 [{...},{...},{...}] = $N_k$
- Number of delimiters per pattern = 1 = $M_k$
- Number of columns created = 2 = $M_{col}$
- Total nonempty cells count = 10 = $RC_{filled}$

330

Data block consistency score =
$1/1*(3*(1/2)*(2/10)) = 0.3000$

400

- Total count of pattern identified = 2 = $k$
- Number of tuples found = 2 [{{},{}}, 4 {{},{},{},{}}] = $N_k$
- Number of delimiters per pattern = 3,2 = $M_k$
- Number of columns created = 4 = $M_{col}$
- Total nonempty cells count = 17 = $RC_{filled}$

332

Data block consistency score =
$1/2*((2*(3/4)+(4*(2/3)))*(4/17) = 0.4901$

402

- Total count of pattern identified = 1 = $k$
- Number of tuples found = 3 [{{},{},{}}] = $N_k$
- Number of delimiters per pattern = 2 = $M_k$
- Number of columns created = 3 = $M_{col}$
- Total nonempty cells count = 1 = $RC_{filled}$

334

Data block consistency score =
$1/1*(3*(2/3)*(3/1)) = 6.000$

Parent Table with highest consistency score — 314

| A\|Fahrenheit,B | MON, JAN 12 | 6,40 |
|---|---|---|
| 100\|C | FRI, MAR 21 | 8,23 |
| 23\|C,8 | SUN, SEP 17 | 71,2 |
| 538\|F,0 | | 8,7 |
| "N/A"\|Celsius | WED, OCT 2 | 6,93 |

500 —

| A\|Fahrenheit,B |
|---|
| 100\|C |
| 23\|C,8 |
| 538\|F,0 |
| "N/A"\|Celsius |

502 —

| MON, JAN 12 |
|---|
| SUN, MAR 21 |
| SUN, SEP 17 |
| |
| WED, OCT 2 |

504 —

| 6,40 |
|---|
| 8,23 |
| 71,2 |
| 8,7 |
| 6,93 |

510 —

| Character | Frequency |
|---|---|
| "\|" | 5 |
| "," | 3 |

512 —

| Character | Frequency |
|---|---|
| "," | 4 |
| "N" | 3 |
| " " | 4 |

514 —

| Character | Frequency |
|---|---|
| "," | 5 |

520 — Used "|" as a delimiter

| A | Fahrenheit,B |
|---|---|
| 100 | C |
| 23 | C,8 |
| 538 | F,0 |
| "N/A" | Celsius |

540 —
- $k = 1$
- $N_k = 1$
- $M_k = 1$
- $M_{col} = 2$
- $RC_{filled} = 10$
- Score = 0.10

522 — Used "," as a delimiter

| A\|Fahrenheit | B |
|---|---|
| 100\|C | |
| 23\|C | 8 |
| 538\|F | 0 |
| "N/A"\|Celsius | |

542 —
- $k = 2$
- $N_k = 1$
- $M_k = 1$
- $M_{col} = 2$
- $RC_{filled} = 8$
- Score = 0.06

524 — Used " " as a delimiter

| MON, | JAN 12 |
|---|---|
| FRI, | MAR 21 |
| SUN, | SEP 17 |
| | |
| WED, | OCT 2 |

544 —
- $k = 1$
- $N_k = 0$
- $M_k = 1$
- $M_{col} = 2$
- $RC_{filled} = 8$
- Score = 0.00

526 — Used "N" as a delimiter

| MO | ,JA | 12 |
|---|---|---|
| FRI, MAR 21 | | |
| SU | ,SEP 12 | |
| | | |
| WED, OCT 2 | | |

546 —
- $k = 3$
- $N_k = [0,1,0]$
- $M_k = [2,0,1]$
- $M_{col} = 3$
- $RC_{filled} = 7$
- Score = 0.00

528 — Used "," as a delimiter

| MON | JAN | 12 |
|---|---|---|
| FRI | MAR | 21 |
| SUN | SEP | 17 |
| | | 2 |
| WED | OCT | |

548 —
- $k = 1$
- $N_k = 0$
- $M_k = 2$
- $M_{col} = 3$
- $RC_{filled} = 12$
- Score = 0.00

530 — Used "," as a delimiter

| 6 | 40 |
|---|---|
| 8 | 23 |
| 71 | 2 |
| 8 | 7 |
| 6 | 93 |

550 —
- $k = 1$
- $N_k = 0$
- $M_k = 1$
- $M_{col} = 2$
- $RC_{filled} = 10$
- Score = 0.00

FIG. 5

ARRANGED STRING
302

A|Fahrenheit,B:MON,JAN 12;6,40
100|C;FRI,MAR 21;8,23
23|C,8;SUN,SEP 17;71,2
538|F,0;;8,7
"N/A"| Celsius;WED,OCT 2;6,93

- Dialect discovered
- Parent Table Delimiter = ";"
- Redundant characters = "|", ","

314

| A|Fahrenheit,B | MON, JAN 12 | 6,40 |
|---|---|---|
| 100|C | FRI, MAR 21 | 8,23 |
| 23|C,8 | SUN, SEP 17 | 71,2 |
| 538|F,0 |  | 8,7 |
| "N/A"|Celsius | WED, OCT 2 | 6,93 |

520

| A | Fahrenheit,B |
|---|---|
| 100 | C |
| 23 | C,8 |
| 538 | F,0 |
| "N/A" | Celsius |

- Dialect discovered
- Child Table Delimiter = "|"
- Redundant characters = ","

FIG. 6

HIERARCHICAL DELIMITER IDENTIFICATION FOR PARSING OF RAW DATA

TECHNICAL FIELD

The disclosure relates to computing systems, and in particular, to computing systems that parse data.

BACKGROUND

Data is stored in repositories, such as databases. Data is stored in many different repositories, in many different formats. With the explosion of data that is collected and stored (e.g., "Big Data"), these different formats make it increasingly difficult to mine the data for useful or desired information. For example, one table may be formatted using certain delimiters, while another table may be formatted using different delimiters. The inconsistency of formatting (e.g., the inconsistent formatting of tabular data) may require a human to manually rectify the formatting, leading to a time consuming and expensive process in order to even begin mining the data for useful or desired information.

SUMMARY

In general, this disclosure describes computer-implemented techniques for identifying tables and/or tables within other tables (e.g., nested tables, or a table within a column and/or cell of another table) and outputting data indicative of the tables and/or tables within other tables, such that any tabular data output is in a consistent format. As such, the techniques of this disclosure enables a machine (e.g., one or more processors of a computing system) to transform inconsistently structured data into commonly structured data for ease of viewing when displayed and/or further processing by downstream computer application(s) or machine(s).

Data, including healthcare data, is currently stored in countless inconsistent formats, which may include tabular data using a wide variety of characters and/or groups of characters, as delimiters. Such delimiters may denote the beginning or end of a row or column or may even denote the existence of a child table (e.g., a table nested within another table). The inconsistency of the formatting impedes the aggregation of the disparate data into much larger, more useful datasets.

Understanding of data structures is essential to understanding both the individual and contextual meaning of a piece of data. Many datasets, including healthcare datasets, are organized in a tabular structure with rows and columns. Additionally, there may be multiple tables within a given block of data. The relationship among the tables may be hierarchical, meaning that a column or cell in a parent table may be populated with a child table that has a row and column structure distinct from that of the parent. A hierarchical structure implies that there is a positional relationship among tables that is more complex than recognizing that the tables are separate from each other and/or that multiple tables are arranged in a particular order.

Without preexisting knowledge about the data structure of a data file, the data file presents as a unidimensional string of characters. Information about columns, rows, and hierarchy is usually expressed through delimiters, i.e., characters whose function it is to separate the individual pieces of data. A delimiter may be a single character or combination of multiple characters (e.g., \n). The data pieces between the delimiters may be referred to, categorically, as payload data.

One aspect of the inconsistent formatting noted above is that different formats may use different characters as delimiters to represent transitions in column, row, and hierarchy level. Further, the characters representing transitions of column and row may differ among levels in a hierarchy.

This disclosure is directed to computer-implemented techniques for automating the identification of column, row, and hierarchy level delimiters within a block of data and outputting payload data in a consistent, recognizable manner. For example, the techniques of this disclosure may include outputting data with rows, columns, hierarchical information in a consistent manner across all tabular data of input data. In some examples, the output data may include data with any rows, columns, and hierarchy clearly labeled in a consistent format. In some examples, the output data may include actual tables for human consumption and/or analysis.

In one example, the techniques described herein include a computing system for parsing and transforming input data, the computing system comprising: memory configured to store the input data; and processing circuitry configured to: obtain the input data; determine a first delimiter; determine a plurality of second delimiter hypotheses; parse the input data according to the first delimiter and the plurality of second delimiter hypotheses to generate a plurality of tables, that are each associated with a respective one of the plurality of second delimiter hypotheses; determine a respective consistency score for each of the plurality of tables; select a table from among the plurality of tables based on the respective consistency score associated with the table; format the input data based on the selected table to generate formatted data; and output the formatted data.

In another example, the techniques described herein include a method of parsing and transforming input data, the method comprising: determining a first delimiter; determining a plurality of second delimiter hypotheses; parsing the input data according to the first delimiter and the plurality of second delimiter hypotheses to generate a plurality of tables that are each associated with a respective one of the plurality of second delimiter hypotheses; determining a respective consistency score for each of the plurality of tables; selecting a table from among the plurality of tables based on the respective consistency score associated with the table; format the input data based on the selected table to generate formatted data; and outputting the formatted data.

In another example, the techniques described herein include a non-transitory computer-readable medium comprising instructions for parsing and transforming input data that when executed, are configured to cause processing circuitry of a computing system to: obtain input data; determine a first delimiter; determine a plurality of second delimiter hypotheses; parse the input data according to the first delimiter and the plurality of second delimiter hypotheses to generate a plurality of tables that are each associated with a respective one of the plurality of second delimiter hypotheses; determine a respective consistency score for each of the plurality of tables; select a table from among the plurality of tables based on the respective consistency score associated with the table; format the input data based on the selected table to generate formatted data; and output the formatted data.

The details of one or more examples are set forth in the accompanying drawings and the description below. Other features, objects, and advantages will be apparent from the description and drawings, and from the claims.

BRIEF DESCRIPTION OF THE DRAWINGS

FIG. 3 is a conceptual diagram of example techniques performed by a parser according to one or more aspects of this disclosure.

FIG. 4 is another conceptual diagram of example techniques performed by a parser according to one or more aspects of this disclosure.

FIG. 5 is another conceptual diagram of example techniques performed by a parser according to one or more aspects of this disclosure.

FIG. 6 is another conceptual diagram of example techniques performed by a parser according to one or more aspects of this disclosure.

DETAILED DESCRIPTION

Figure 1:
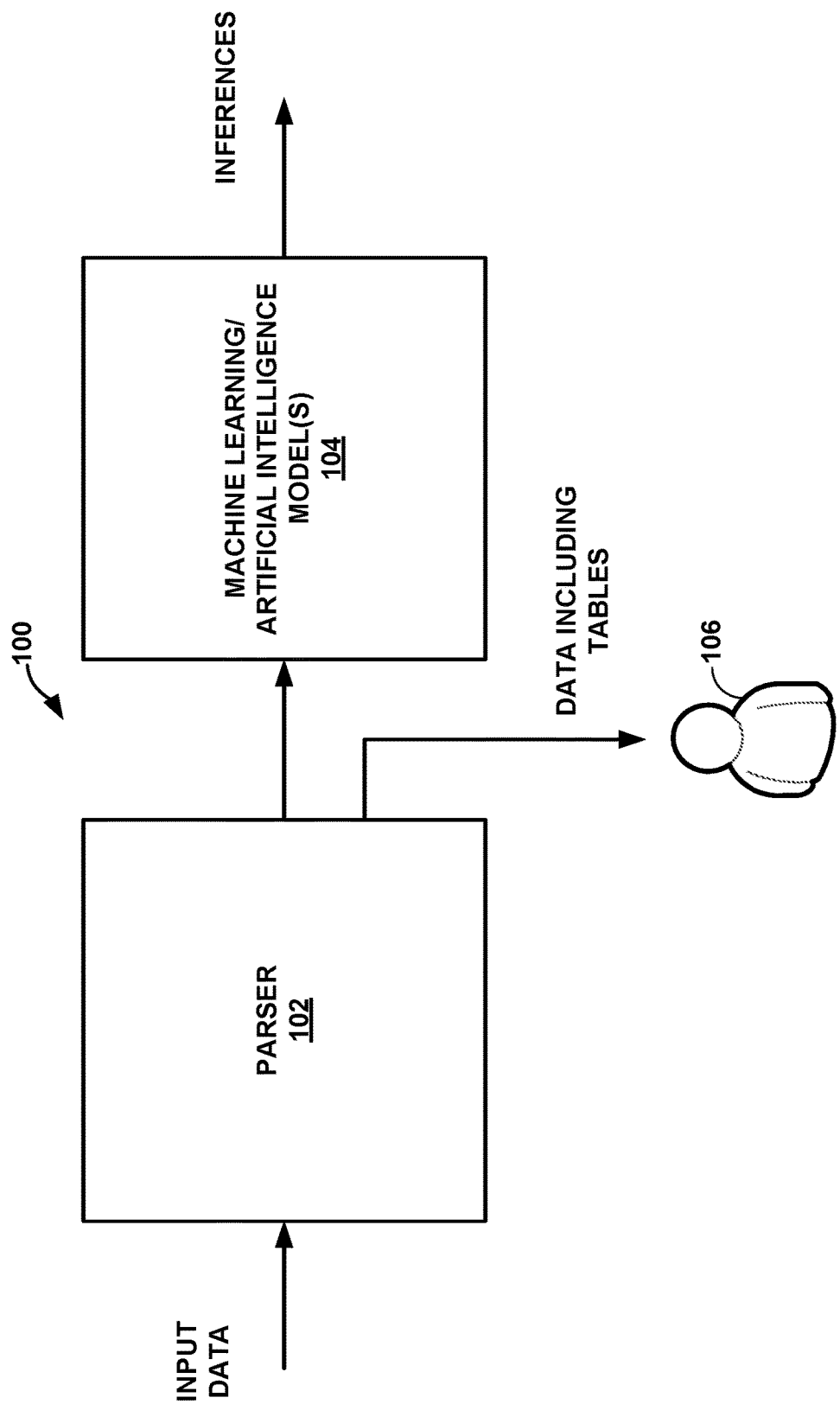
FIG. 1 is a block diagram illustrating an example system for analyzing data of various formats according to one or more aspects of this disclosure.

This disclosure is directed to techniques and systems for parsing blocks of data and outputting data in a consistent format. To aid in understanding, the following definitions of terms are set forth.

A pattern as used herein includes one or more repeating consecutive characters (which may include an alphanumeric character, a special character, etc.) occurring at regular intervals (e.g., every 10 characters). A pattern may be indicative of a potential delimiter.

A delimiter may be one or more consecutive characters (which may include an alphanumeric character, a special character, etc.) that divide a longer sequence of characters (e.g., a block or string of data) into a meaningful structure (e.g., a row, a column, a child table, etc.).

A tuple may refer to a set of two or more alphanumeric characters, separated by delimiters such as to be contained within a cell (where a cell is defined by a column and a row).

An escape character may be a character or sequence of characters that has special meaning to one or more compilers. Some examples of escape sequences include the following:

| Escape Sequence | Description |
| --- | --- |
| \t | Insert a tab in the text at this point. |
| \b | Insert a backspace in the text at this point. |
| \n | Insert a new line in the text at this point. |
| \r | Insert a carriage return in the text at this point. |
| \f | Insert a form feed in the text at this point. |
| \' | Insert a single quote character in the text at this point. |
| \" | Insert a double quote character in the text at this point. |
| \\ | Insert a backslash character in the text at this point. |

Redundancy generally relates to factors that lead to inconsistent formatting at various levels of the data hierarchy. Redundancy is usually referred to in the following contexts, each of which is defined with more specificity: a redundant character may be a character or set of characters that are identified as a hypothetical delimiter but are subsequently determined not to be a delimiter due to their non-uniform distribution in a data block (e.g., input data). The segregation of information upon applying hypothesized delimiters may result in a tabular representation of resulting data. If the last column of tabular data in a hypothesized representation does not have all of its cells filled (e.g., one or more cells in the last column are empty or null), this may be characterized as redundancy within a pattern. If the segregation of information upon applying hypothesized delimiters results in a tabular representation of data in multiple columns and some column cells carry a tuple (defined above), then such column cells in the table may be characterized as having redundancy within a column.

The techniques of this disclosure may identify delimiters in a block of data, which may be referred to as input text. Input text may include a series of characters, including one or more sets of delimiter characters and payload data (e.g., the data separated by the delimiter characters).

The techniques of this disclosure may be an improvement over previous techniques. As discussed above, data is stored in many inconsistent formats. Such data may include tables using different delimiters to indicate the end of a column, the end of a row, a child table contained within a cell of the table, or the like. As such, analysis and/or processing of the data in its inconsistently formatted state may be exceedingly difficult or impossible, particularly with the large volume of data (e.g., "Big Data") that may be used for such analysis and/or processing. The techniques of this disclosure may be advantageous by transforming data of varying and inconsistent formats and to data of a consistent format for analysis by downstream techniques or for viewing by a person. The techniques of this disclosure may identify delimiters based on a consistency score, which may produce improved results in the consistency of the transformed data over other techniques. Moreover, the techniques of this disclosure may identify child tables within the inconsistently formatted data and transform data of the child tables into a consistent format for analysis by downstream techniques or for viewing by a person. The techniques of this disclosure may save time, money and effort, while improving the ability of a downstream application, or computing device, to effectively analyze or process the transformed data when compared to analyzing or processing the original, inconsistently formatted data.

FIG. 1 is a block diagram illustrating an example system for analyzing data of various formats according to one or more aspects of this disclosure. System 100 may include parser 102, one or more machine learning and/or artificial intelligence model(s) 104, and person 106.

Parser 102 may be configured to accept input data. The input data may be formatted inconsistently, with various delimiters used to delineate rows, columns, and/or hierarchy information of tabular data being inconsistent among different tables. Parser 102 may, according to the techniques of this disclosure, process the input data to determine row, column, and/or hierarchy delimiters. Parser 102 may output formatted data. For example, parser 102 may output a set of characters corresponding to delimiters for each of columns, rows, and (if applicable) child tables and/or a series of chunks of payload data in which each chunk is labeled according to column, row, and (if applicable) hierarchy level (parent or child table). Such data may be input to one or more machine learning and/or artificial intelligence model(s) 104, for training purposes, or for analysis by one or more machine learning and/or artificial intelligence model(s) 104. In some examples, parser 102 may output data in tabular form for person 106 to view and/or analyze. One or more machine learning and/or artificial intelligence model(s) 104 may analyze the data output by parser 102 and may make inferences or predictions based on the input data.

Figure 2:
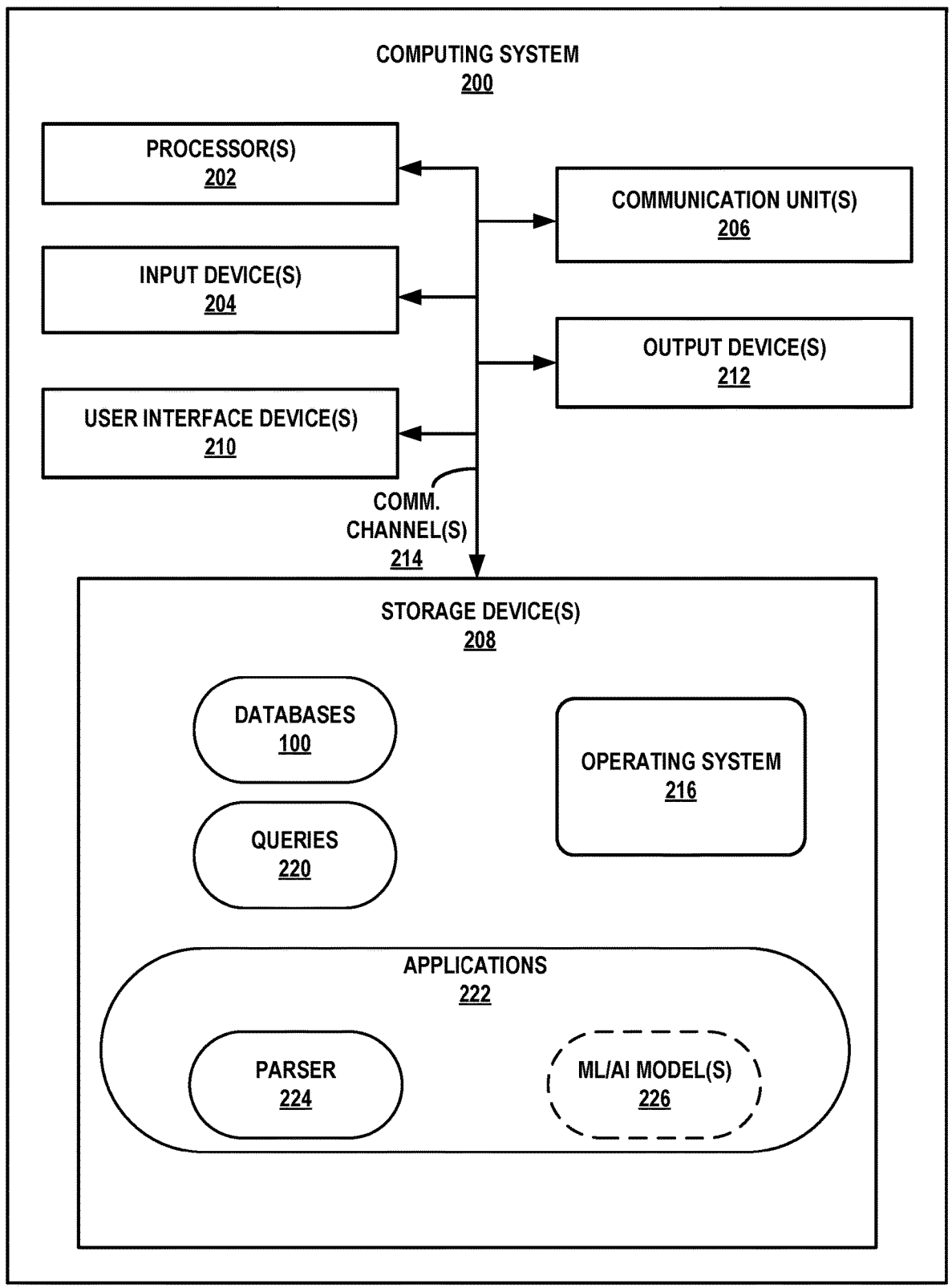
FIG. 2 is a block diagram depicting an example computing system configured to identify delimiters and output formatted data in accordance with one or more aspects of this disclosure.

FIG. 2 is a block diagram depicting an example computing system 200 configured to identify delimiters and output formatted data in accordance with one or more aspects of this disclosure. FIG. 2 may illustrate a particular example of computing system 200 having one or more computing devices, each computing device including one or more processors 202 and configured to identify delimiters and output formatted data. Computing system 200 may be an example of parser 102 and/or one or more machine learning and/or artificial intelligence model(s) 104, both of FIG. 1.

In the example of FIG. 2, computing system 200 may include a workstation, server, mainframe computer, notebook or laptop computer, desktop computer, tablet, smartphone, feature phone, and/or other programmable data-processing apparatus of any kind. In some examples, a computing system may be or may include any component or system that includes one or more processors or other suitable computing environment for executing software instructions and, for example, need not necessarily include one or more components shown in FIG. 2 (e.g., communication units 206; and in some examples, components such as storage device(s) 208 may not be in the computing system 200).

As shown in the specific example of FIG. 2, computing system 200 includes one or more processors 202, one or more input devices 204, one or more communication units 206, one or more output devices 212, one or more storage devices 208, and one or more user interface (UI) devices 210. Computing system 200, in one example, further includes one or more applications 222 and an operating system 216 executable by computing system 200. Communication channels 214 may couple each of components 202, 204, 206, 208, 210, and 212 (physically, communicatively, and/or operatively) for inter-component communications. In some examples, communication channels 214 may include a system bus, a network connection, an inter-process communication data structure, or any other method for communicating data. As one example, components 202, 204, 206, 208, 210, and 212 may be coupled by one or more communication channels 214. In some examples, two or more of these components may be distributed across multiple (discrete) computing devices. In some such examples, communication channels 214 may include wired or wireless data connections between the various computing devices. It should be understood that, in some examples, a computing system such as computing system 200 may include fewer or more components than those depicted in FIG. 2 and still perform the techniques of this disclosure.

Processors 202, in one example, are configured to implement functionality and/or process instructions for execution within computing system 200. For example, processors 202 may be capable of processing instructions stored in storage device 208. Examples of processors 202 may include any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within computing system 200 during operation. Storage device(s) 208, in some examples, are described as computer-readable storage media. In some examples, storage device 208 is a temporary memory, meaning that a primary purpose of storage device 208 is not long-term storage. Storage device 208, in some examples, is described as a volatile memory, meaning that storage device 208 does not maintain stored contents when the computer is turned off. Examples of volatile memories include random access memories (RAM), dynamic random access memories (DRAM), static random access memories (SRAM), and other forms of volatile memories known in the art. In some examples, storage device 208 is used to store program instructions for execution by processors 202. Storage device 208, in one example, is used by software or applications running on computing system 200 to temporarily store information during program execution. For example, as shown in FIG. 2, storage device 208 is configured to store operating system 216, one or more databases 100 (e.g., database 100 of FIG. 1), a set of historical queries 220 previously executed over database(s) 100, and various programs or applications 222, including a database-refiner module 224 (also referred to herein as "parser 224"), in accordance with the techniques of this disclosure, as detailed further below.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing system 200, in some examples, also includes one or more communication units 206. Computing system 200, in one example, utilizes communication units 206 to communicate with external devices via one or more networks, such as one or more wired/wireless/mobile networks. Communication unit(s) 206 may include a network interface card, such as an Ethernet card, an optical transceiver, a radio frequency transceiver, or any other type of device that can send and receive information. Other examples of such network interfaces may include 3G, 4G, 5G and Wi-Fi radios. In some examples, computing system 200 uses communication unit 206 to communicate with an external device. For example, computing system 200 may obtain input text via one or more communication units 206 from one or more of a computing device, another computing system, a database, an external storage device, and/or the like.

Computing system 200, in one example, also includes one or more user interface devices 210. User interface devices 210, in some examples, are configured to receive input from a user through tactile, audio, or video feedback. Examples of user interface device(s) 210 include a presence-sensitive display, a mouse, a keyboard, a voice responsive system, video camera, microphone or any other type of device for detecting a command from a user. In some examples, a presence-sensitive display includes a touch-sensitive screen.

One or more output devices 212 may also be included in computing system 200. Output device 212, in some examples, is configured to provide output to a user using tactile, audio, or video stimuli. Output device 212, in one example, includes a presence-sensitive display, a sound card, a video graphics adapter card, or any other type of device for converting a signal into an appropriate form understandable to humans or machines. Additional examples of output device 212 include a speaker, a cathode ray tube (CRT) monitor, a liquid crystal display (LCD), or any other type of device that can generate intelligible output to a user.

Computing system 200 may include operating system 216. Operating system 216, in some examples, controls the operation of components of computing system 200. For example, operating system 216, in one example, facilitates the communication of one or more applications 222 with processors 202, communication unit 206, storage device 208, input device 204, user interface device 210, and output device 212. Application 222 may also include program instructions and/or data that are executable by computing system 200.

Parser 224 is one example of one of applications 222 of computing system 200. Parser 224 may be an example of parser 102 of FIG. 1. Parser 224 may include instructions for causing computing system 200 to perform techniques described in the present disclosure, for example, to identify delimiters and output formatted data. For example, in accordance with the techniques of this disclosure, and as detailed further below, parser 224, when executed by one or more processors 202, is configured to determine a row delimiter. Parser 224 may then determine a plurality of column delimiter hypotheses. Parser 224 may then parse the input data according to the row delimiter and each column delimiter hypothesis to generate a plurality of tables that are each associated with a respective one of the plurality of column delimiter hypotheses. Parser 224 may determine a respective consistency score for each of the plurality of tables. Parser 224 may select a table of the plurality of tables based on the respective consistency score associated with the table. Parser 224 may output formatted data. The formatted data may be labeled according to a column and a row of the table.

In some examples, machine learning/artificial intelligence model(s) 226 (ML/AI model(s) 226) may be example(s) of one or more of applications 222 of computing system 200. ML/AI model(s) 226 may be example(s) of machine learning/artificial intelligence model(s) 104 of FIG. 1.

The techniques of this disclosure are described with respect to determining row and column delimiters of tables. While primarily described as determining a row delimiter and determining column delimiter hypotheses, it should be understood that the techniques of this disclosure are equally applicable to determining a column delimiter and determining row delimiter hypotheses. In other words, when describing the techniques of this disclosure, the word "column" may be substituted for the word "row" and the word "row" may be substituted for the word "column" and such techniques would still fall within the scope of this disclosure.

FIG. 3 is a conceptual diagram of example techniques performed by a parser according to one or more aspects of this disclosure. The example of FIG. 3 is a relatively simple example operations of parser 102 on a string of input data, input string 300.

For example, parser 102 may obtain a string of input data, such as input string 300 including "A|Fahrenheit,B; MON, JAN 12; 6,40\n100|C; FRI,MAR; 8,23\n23|C: 8; SUN,SEP 17; 71,2\n538|F,0; 8,7\n"N/A"| Celcius; WED,OCT 2; 6,93". Parser 102 may determine to use \n as a row delimiter. The row delimiter may be selected from a list of potential row delimiters. For example, parser 102 may scan the input text for matches to the potential row delimiters. For example, the list of potential row delimiters may include escape characters such as \n and \r. In some examples, parser 102 may determine row delimiters by determining that the string or block of input data contains only one delimiter from the list of potential row delimiters. If the string or block of input data contains only one delimiter from the list of potential row delimiters, the one delimiter may be assumed to be the row delimiter. If the string or block of input data includes more than one delimiter from the list of potential row delimiters, parser 102 may, for example, select the row delimiter using one or more of the following criteria: a) the respective delimiter of the more than one delimiter from the list of potential row delimiters having a greatest regularity (e.g., lowest variation) in the number of characters separating occurrences of the respective delimiter; and/or b) the respective delimiter of the more than one delimiter from the list of potential row delimiters associated with the highest consistency score as described below when the input text block is parsed with the respective row delimiter. For example, a delimiter having the greatest regularity may be a delimiter that has a highest number of occurrences of a same number of characters in intervals between different occurrences (a first occurrence and a second occurrence, the second occurrence and a third occurrence, and so on) of the delimiter. For example, if "\n" appears 6 times, "\n" then has 5 intervals between those occurrences of "\n." If there are 10 characters in each of those intervals, then "\n" has a very high regularity (5 out of 5) in the number of characters (10) separating occurrences of "\n." and would have a greater regularity than another potential row delimiter having 8 characters appearing in 4 out of 5 intervals.

Parser 102 may utilize the row delimiter "\n" to arrange the input string into rows (e.g., replacing the "\n" delimiters with returns) to generate arranged string 302. While arranged string 302 is arranged in rows, there are no separate columns (e.g., there is a single column including data that may include column delimiters and/or hierarchical delimiters).

Parser 102 may determine a frequency of use of characters (or sets of adjacent characters), such as frequency of characters 304. Parser 102 may identify the N most frequent characters (or sets of adjacent characters) as potential or hypothetical column delimiters. N may be programmable or pre-determined. In the example of FIG. 3, N may equal three. Thus, parser 102 may identify comma (,), semicolon (;), and bar (|), as potential column delimiters (also called column delimiter hypotheses herein), as these are the three most common characters appearing in the arranged data.

Each set of one or more characters that is both frequent occurring and occurring at regular intervals may be referred to as a "pattern." Parser 102 may determine that each pattern is a column delimiter hypothesis of the plurality of column delimiter hypotheses. Each of the column delimiter hypothesis may be quantified for consistency (e.g., a consistency score) as described herein. In some examples, parser 102 may generate hypotheses as to the column delimiter. For example, each hypothesis may posit a set of one or more characters as a hypothetical column delimiter. Hypotheses may be determined as follows: a) Identify one or more characters that appear frequently without considering (e.g., ignoring) the character or characters that were identified as row delimiters; and b) Of the frequently occurring character(s), identify those that occur at regular intervals. Each character or set of consecutive characters that is relatively frequent and is regular may be pattern. Each pattern may form the basis of a hypothesis whose output can be quantified for consistency as described below.

Parser 102 may (e.g., in parallel), analyze each of the column delimiter hypotheses. For example, parser 102 may parse the arranged data according to the use of "|" as a column delimiter, parse the arranged data according to the use of "," as a column delimiter, and parse the arranged data according to the use of ";" as a column delimiter. This may result in the generation of N potential tables, namely potential table 310 (using "|" as a column delimiter), potential table 312 (using "," as a column delimiter), and potential table 314 (using ";" as a column delimiter). In some examples, parser 102 may parse the data block according to the row delimiter (identified above) and each of the hypothetical column delimiters (determined above). The outputs of this parsing step may include a series of tables, with each table resulting from parsing the input text block according to row delimiter and one of the hypothetical column delimiters.

If there are blank cells in the last column (e.g., far right column) of a potential table, that potential table may be further processed to generate a number of patterns. When parser 102 generates a single table for a given column delimiter hypothesis, that table equates to a pattern associated with that table's column delimiter hypothesis. For example, for both the column delimiter hypothesis "|" and the column delimiter hypothesis ";", parser 102 finds no empty cells in the last column. Thus, there is a single respective pattern (pattern 320 and pattern 326, respectively) for both column delimiter hypothesis "|" and the column delimiter hypothesis ";". It should be noted that pattern 320 is identical to potential table 310 and pattern 326 is identical to potential table 314. For the column delimiter hypothesis ",", there are empty cells in the last column. In such a case, parser 102 may generate more than one pattern. In this example, parser 102 may generate a first pattern 322 having four columns and including all rows having data included in the four columns. Parser 102 may generate a second pattern 324 having three columns, including all rows having data included only in the three columns (e.g., not having data in the fourth column). In some examples, more than two patterns may be generated for a given potential table.

Parser 102 may determine, for each of the potential tables, a total count of patterns, a number of tuples found, a number of delimiters per pattern, a number of columns created, and a number of nonempty cells, as shown, which may be input into a calculation of a consistency score (or inconsistency score). For example, parser 102 may generate data 330 for potential table 310, data 332 for potential table 312, and data 334 for potential table 314. With respect to data 330, it can be seen that there is one pattern in potential table 310, namely pattern 320. There are three distinct tuples within potential table 310 (the tuple in the first row is repeated in the third row and the tuple in the second row is repeated in the fifth row). There is a single delimiter "|" for the pattern 320 and the number of columns created by the delimiter is 2. Every cell of the 10 cells in potential table 310 contains data, so the total number of nonempty cells is 10.

FIG. 4 is another conceptual diagram of example techniques performed by a parser according to one or more aspects of this disclosure. From data 330, data 332, and data 334, parser 102 may determine a consistency score for each of the respective potential tables (potential tables 310, 312, and 314). For example, parser 102 may determine a score that is representative of the consistency of data in a potential table. In some examples, the consistency score is determined according to the following equation:

$$P(x, \theta) = \frac{1}{k} \sum_{k=1}^{k} N_k \left( \frac{M_k}{(M_k + 1)} \right) * \left( \frac{M_{col}}{RC_{filled}} \right),$$

where P is a function yielding the consistency score, x is a block of input text, θ is a hypothetical delimiter applied to the input text, k is a total number of unique patterns found while processing for θ, $N_k$ is a total number of tuples, $M_k$ is a total number of delimiters per pattern, $M_{col}$ is a total number of columns created, and $RC_{filled}$ is a total number of rows and columns filled by values. It should be understood that parser 102 may use another formula(s) than the example shown above to determine a respective consistency score or an inconsistency score for each of the plurality of tables. In general, the formula may be designed to penalize the consistency score for cases in which there is a lower ratio of observed delimiters and a higher proportion of total empty fields in the associated table. This is because more potential delimiters reflect inconsistency in record breakdown and, likewise, a higher number of empty fields suggests greater inconsistency.

In the example of FIG. 4, the above formula was used to determine consistency scores. For example, consistency score 400 for potential table 310 associated with the column delimiter hypothesis of "|" is equal to 0.3, consistency score 402 for potential table 312 associated with the column delimiter hypothesis of "," is 0.4901, and consistency score 404 for potential table 314 associated with the column delimiter hypothesis of ";" is 6.0. Parser 102 may select the potential table having the highest associated consistency score (or lowest inconsistency score), potential table 314, as an identified table, and discard the other potential tables from the plurality of potential tables. In this manner, parser 102 may confirm the column delimiter hypothesis ";" associated with the potential table having the highest consistency score as a column delimiter. Parser 102 may use the confirmed column delimiter and the row delimiter to format the input data and may output data including some identification of the rows and columns in the identified table. However, sometimes a table may include one or more child tables.

FIG. 5 is another conceptual diagram of example techniques performed by a parser according to one or more aspects of this disclosure. As some tables may include one or more child tables, it may be desirable to identify any child tables contained in the input data and output data in a consistent format for such child tables (e.g., hierarchical delimiters, row delimiters, and/or column delimiters). In the example of FIG. 5, the identified table (potential table 314) is processed to determine if the identified table includes other table(s) (e.g., the identified table is a parent table having one or more child tables).

Parser 102 may proceed to analyze the identified table (potential table 314) using similar techniques that parser 102 used to determine the identified table. However, in this instance, parser 102 may proceed in a column-by-column manner, examining each column to determine whether that column may include a child table, as some level of consistency of data within cells of a particular column may be expected. For example, parser 102 may determine a frequency 510 of M characters in first column 500 of the identified table. In this example, the character "|" appears five times in the first column and the character "," appears 3 times in the first column. Parser 102 may similarly determine a frequency 512 of characters in second column 502 and determine a frequency 514 of characters in third column 504.

Parser 102 may determine a number of potential child tables utilizing M number of hierarchical delimiter hypotheses. For example, for first column 500 of the identified table, parser 102 may generate a potential child table 520 based on "|" being a hierarchical delimiter hypothesis and a potential child table 522 based on "," being a hierarchical delimiter hypothesis. Parser 102 may similarly generate potential child tables 524, 526, and 528 for second column 502 and generate potential child table 530 for third column 504.

Parser 102 may determine a consistency score of each of the generated potential child tables for a given column. For example, parser 102 may determine a consistency score 540 for potential child table 520 and a consistency score 542 for potential child table 522. Parser 102 may make similar determinations across all the columns of the identified table, e.g., consistency score 544 for potential child table 524, consistency score 546 for potential child table 526, consistency score 548 for potential child table 528, and consistency score 550 for potential child table 530. In some examples, parser 102 may make such determinations in parallel. Parser 102 may take the potential child table having a highest consistency score within a given column as being an identified child table. For example, potential child table 520 of first column 500 of the identified table, the hierarchical delimiter hypothesis of "|" has a higher consistency score than that of the hierarchical delimiter hypothesis of ",", and parser 102 may identify potential child table 520 as a child table.

FIG. 6 is another conceptual diagram of example techniques performed by a parser according to one or more aspects of this disclosure. From arranged string 302, parser 102 may determine the identified table (potential table 314). From the identified table, parser 102 may determine that "|" is a hierarchical delimiter and that first column 500 of the identified table includes a child table (e.g., potential child table 520). Parser 102 may iteratively continue such techniques until each remaining consistency score equals 0 (e.g., see FIG. 5), which may indicate that no tables are present in a given column. For example, in the child table, parser 102 may repeat such techniques to determine if any column(s) of the child table include any further child table(s).

Figure 7:
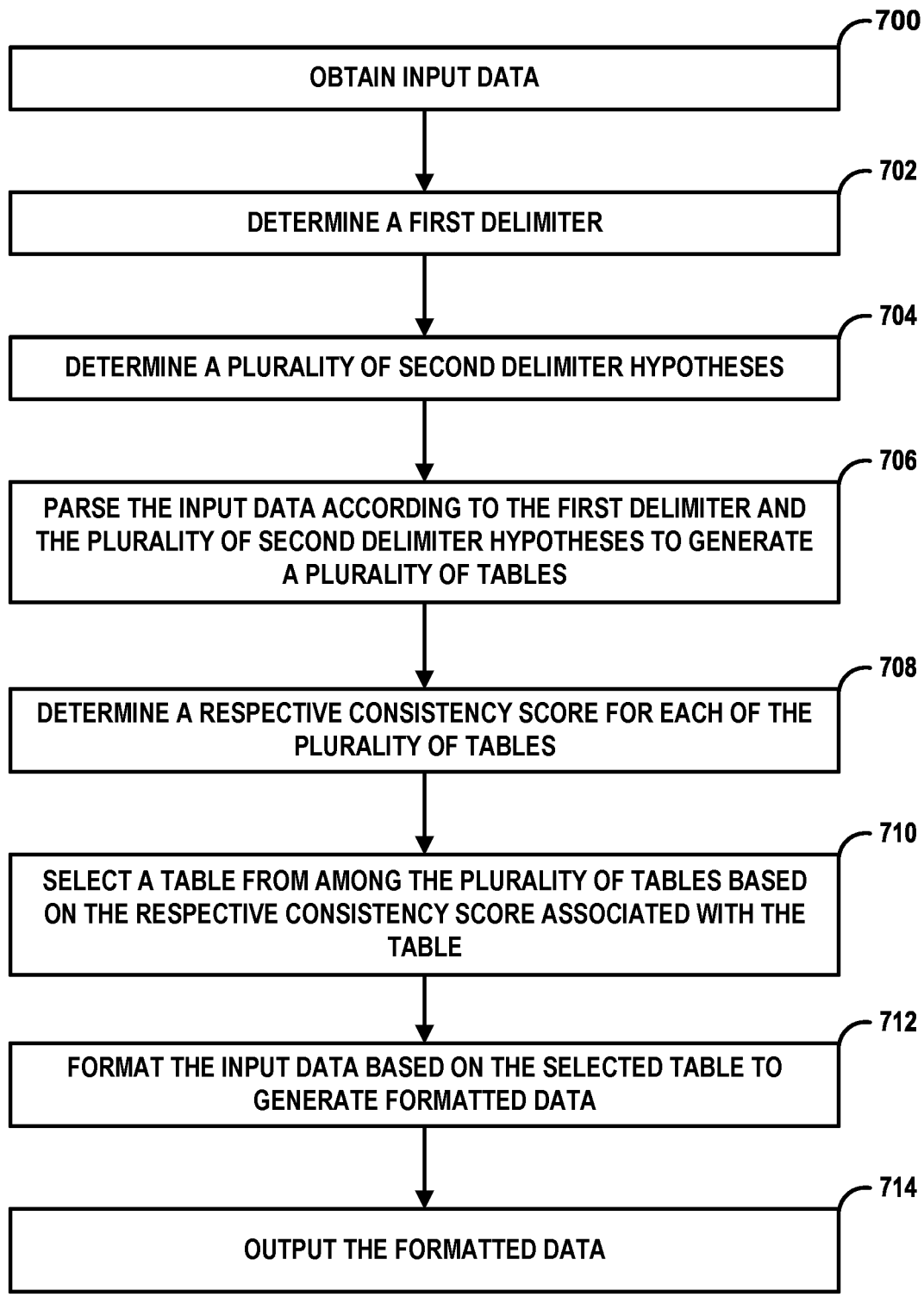
FIG. 7 is a flowchart illustrating another example database-refinement process according to one or more aspects of this disclosure.

FIG. 7 is a flowchart illustrating example delimiter identification techniques according to one or more aspects of this disclosure. One or more processors 202 may obtain input data (700). For example, one or more communication units 206 may receive input data from one or more of a computing device, another computing system, a database, an external storage device, or the like. One or more processors 202 may obtain the input data from one or more communication units 206. Additionally, or alternatively, one or more processors 202 may obtain the input data from one or more storage devices 208 and/or one or more input devices 204.

One or more processors 202 may determine a first delimiter (702). For example, one or more processors 202 may determine a row delimiter. One or more processors 202 may select the row delimiter from a list of potential row delimiters. One or more processors 202 may scan the input text for matches to the potential row delimiters. For example, the list of potential row delimiters may include escape characters such as "\n" and "\r". In some examples, when determining the row delimiter, one or more processors 202 may determine that a text block contains only one delimiter from the list of potential row delimiters and determine the row delimiter to be that only one delimiter. In some examples, when more than one delimiter from the list of potential row delimiters is present in the input text block, one or more processors 202 may determine the row delimiter as the potential row delimiter having a greatest regularity (e.g., lowest variation) in the number of characters separating the hypothetical row delimiter or as the potential row delimiter associated with a highest consistency score among the potential row delimiters. In some examples, rather than be a row delimiter, the first delimiter may be a column delimiter.

One or more processors 202 may determine a plurality of second delimiter hypotheses (704). For example, one or more processors 202 may generate a list of potential column delimiters as a plurality of column delimiter hypotheses. Each of the plurality of column delimiter hypotheses may include a set of one or more characters as a potential column delimiter. For example, one or more processors 202 may identify characters (e.g., individually and/or in groups of more than on characters) that appear relatively frequently. In some examples, one or more processors 202 may not consider, as column delimiter hypotheses, any character or combination of characters that constitute or is a part of the row delimiter. For example, one or more processors 202 may ignore the row delimiters when determining the plurality of column delimiter hypotheses. Of the frequently occurring characters, one or more processors 202 may identify those frequently occurring characters that occur at regular intervals. In some examples, such as where the first delimiter is a column delimiter, the plurality of second delimiter hypotheses may be a plurality of row delimiter hypotheses.

One or more processors 202 may parse the input data according to the first delimiter and the plurality of second delimiter hypotheses to generate a plurality of tables that are each associated with a respective one of the plurality of second delimiter hypotheses (706). For example, one or more processors 202 may generate a table for each of the plurality of column delimiter hypotheses, such that if a column delimiter hypothesis of "/c" was a column delimiter hypothesis, an associated table would be generated that has a new column when the column delimiter hypothesis of "/c" is encountered in the input data.

One or more processors 202 may determine a respective consistency score for each of the plurality of tables (708). In some examples, the consistency score is determined according to the following equation:

$$P(x, \theta) = \frac{1}{k} \sum_{k=1}^{k} N_k \left( \frac{M_k}{(M_k + 1)} \right) * \left( \frac{M_{col}}{RC_{filled}} \right),$$

where P is a function yielding the consistency score, x is a block of input text, $\theta$ is a hypothetical delimiter applied to the input text, k is a total number of unique patterns found while processing for $\theta$, $N_k$ is a total number of tuples, $M_k$ is a total number of delimiters per pattern, $M_{col}$ is a total number of columns created, and $RC_{filled}$ is a total number of rows and columns filled by values. It should be understood that one or more processors 202 may use another formula(s) than the example shown above to determine a respective consistency score for each of the plurality of tables. In general, the formula may be designed to penalize the consistency score for cases in which there is a lower ratio of observed delimiters and a higher proportion of total empty fields in the associated table. This is because more potential delimiters reflect inconsistency in record breakdown and, likewise, a higher number of empty fields suggests greater inconsistency.

It should be understood that a consistency score could be represented by its inverse, inconsistency, and the table with the lowest inconsistency score (rather than the highest consistency score) could be selected without meaningful change to the techniques disclosed herein.

One or more processors 202 may select a table of the plurality of tables based on the respective consistency score associated with the table (710). For example, one or more processors 202 may select the table that has the highest consistency score (or the lowest inconsistency score) from among the plurality of tables. This table may be associated with the column delimiter hypothesis that generates parsed data with the highest consistency score and may be the true column delimiter.

One or more processors 202 may format the input data based on the selected table to generate formatted data (712). For example, one or more processors 202 may format the input data based on the row delimiter and the column delimiter used to generate the selected table.

One or more processors 202 may output the formatted data (714). The formatted data may include payload data that is labeled according to a column and a row of the table. For example, one or more processors 202 may output the payload data in the form of a table, or otherwise label the payload data in a manner that a human could discern the beginning and/or ending of columns and rows.

Figure 8:
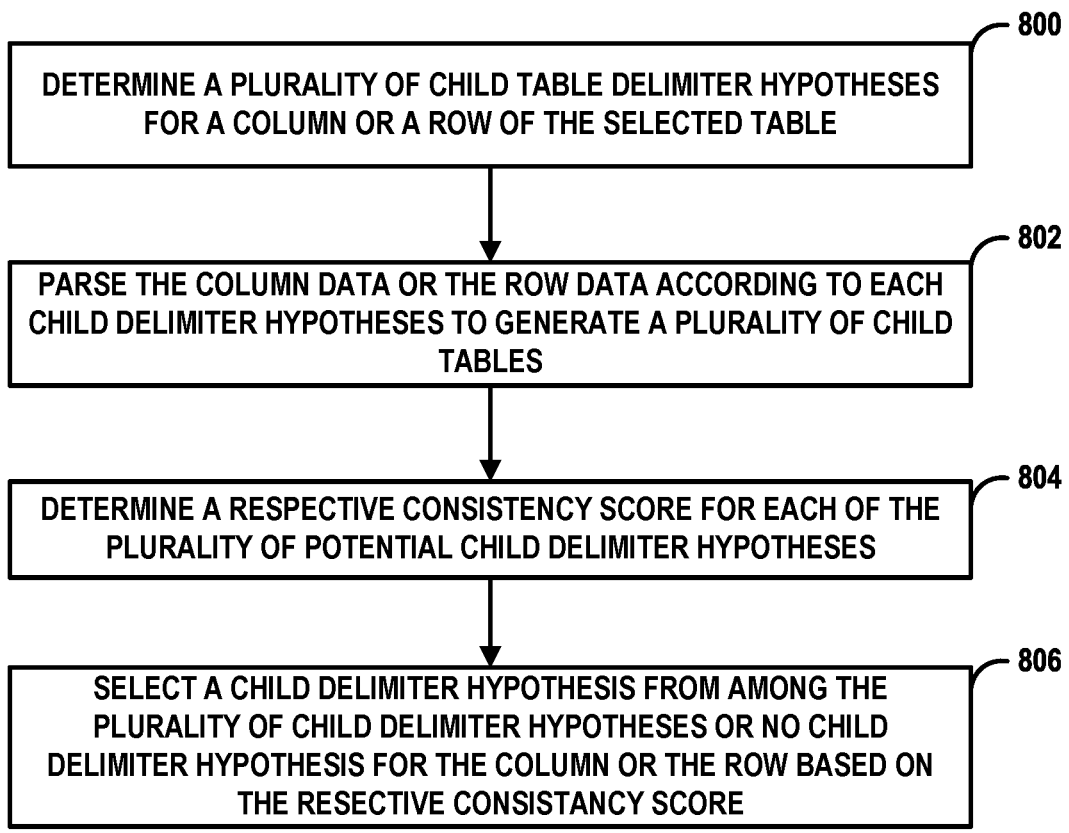
FIG. 8 is a flowchart illustrating example child table identification techniques according to one or more aspects of this disclosure.

FIG. 8 is a flowchart illustrating example child table identification techniques according to one or more aspects of this disclosure. It is not uncommon for a table (sometimes referred to as a parent table) to include a nested table or include another table within a column or cell of the table (sometimes referred to as a child table). In such cases, it may be desirable to identify that there is a child table as the child table may include a hierarchical delimiter, its own row delimiter and column delimiter, which may and/or may not be the same as the row delimiter and column delimiter for the parent table, and it may be desirable to organize the data of the child table in tabular form.

As such, one or more processors 202 may determine a plurality of child delimiter hypotheses (800). A child delimiter may be a hierarchical delimiter that identifies a child table. As described above for the second delimiter hypotheses, one or more processors 202 may determine potential child delimiters according to the frequency and/or regularity with which a character or set of characters appears. However, the discussion above for the column delimiter hypotheses, one or more processors 202 may determine the frequency may be within the scope of an individual column (or row), rather than the entire table. This is because a given column (or row) may contain one or more tables within the cells of the column (or row) and another column (or row) may not.

One or more processors 202 may parse the column data or the row data according to the plurality of child table delimiter hypotheses (802). For example, one or more processors 202 may generate a plurality of potential child tables based on the child table delimiter hypotheses, each of the plurality of potential child tables associated with a respective one of the plurality of child delimiter hypotheses.

One or more processors 202 may determine a respective consistency score for each of the plurality of child delimiter hypotheses (804). In some examples, one or more processors 202 may use the same formula (or a different formula) to determine the consistency scores of the child delimiter hypotheses as for determining the consistency scores of the column delimiter hypotheses.

One or more processors 202 may select a child delimiter hypothesis of the plurality of child delimiter hypotheses or no child delimiter hypothesis for a column based on the respective consistency score (806). For example, one or more processors 202 may select no child delimiter hypothesis based on each determined respective consistency score for a given column (or a given row) being equal to zero or one or more processors 202 may select the child delimiter hypothesis having a highest consistency score among the plurality of child delimiter hypotheses for the column (or the row).

One or more processors 202 may output, for each block of input data, a set of characters corresponding to row delimiter(s), column delimiter(s) and (if applicable) child delimiter(s). Additionally, or alternatively, one or more processors 202 may output a series of groups of payload data in which each group is labeled according to column, row, and (if applicable) hierarchy level (parent or child table). For example, the output data may be further processed by, for example, one or more machine learning and/or artificial intelligence models, for training purposes and/or to generate inference(s) regarding the input data. In some examples, one or more processors 202 may output the groups of payload data in the form of one or more tables, for example, for human consumption and/or interpretation.

This disclosure includes the following non-limiting examples.

Example 1. A computing system for parsing and transforming input data, the computing system comprising: memory configured to store the input data; and processing circuitry configured to: obtain the input data; determine a first delimiter; determine a plurality of second delimiter hypotheses; parse the input data according to the first delimiter and the plurality of second delimiter hypotheses to generate a plurality of tables that are each associated with a respective one of the plurality of second delimiter hypotheses; determine a respective consistency score for each of the plurality of tables; select a table from among the plurality of tables based on the respective consistency score associated with the table; format the input data based on the selected table to generate formatted data; and output the formatted data.

Example 2. The computing system of example 1, wherein the formatted data comprises payload data labeled according to a column and a row of the table.

Example 3. The computing system of example or example 2, wherein as part of selecting the table from among the plurality of tables based on the respective consistency score associated with the table, the processing circuitry is configured to select the table having a highest consistency score among the plurality of tables.

Example 4. The computing system of any of examples 1-3, wherein the processing circuitry is further configured to: determine a plurality of child delimiter hypotheses for a column or a row of the selected table, the column including column data or the row including row data; parse the column data or the row data according to each child delimiter hypotheses to generate a plurality of child tables, each of the plurality of child tables associated with a respective one of the plurality of child delimiter hypotheses; determine a respective consistency score for each of the plurality of child delimiter hypotheses; and select a child delimiter hypothesis among the plurality of child delimiter hypotheses or no child delimiter hypothesis for the column or the row based on the respective consistency score.

Example 5. The computing system of example 4, wherein as part of selecting the child delimiter hypothesis from among the plurality of child delimiter hypotheses or no child delimiter hypothesis for the column or the row based on the respective consistency score, the processing circuitry is further configured to select no child delimiter hypothesis based on each determined respective consistency score for the column or the row being equal to zero.

Example 6. The computing system of example 4, wherein as part of selecting the child delimiter hypothesis of the plurality of child delimiter hypotheses or no child delimiter hypothesis for the column or the row based on the respective consistency score, the processing circuitry is configured to select the child delimiter hypothesis having a highest consistency score among the plurality of child delimiter hypotheses for the column or the row.

Example 7. The computing system of any of examples 1-6, wherein the first delimiter is a row delimiter, the plurality of second delimiter hypotheses comprises a plurality of column delimiter hypotheses, and wherein as part of determining the respective consistency score, the processing circuitry is configured to determine:

$$P(x, \theta) = \frac{1}{k}\sum_{k=1}^{k} N_k\left(\frac{M_k}{(M_k+1)}\right) * \left(\frac{M_{col}}{RC_{filled}}\right),$$

where P is a function yielding the consistency score, x is a block of input text, θ is a hypothetical delimiter applied to the input text, k is a total number of unique patterns found while processing for θ, $N_k$ is a total number of tuples, $M_k$ is a total number of delimiters per pattern, $M_{col}$ is a total number of columns created and $RC_{filled}$ is a total number of rows and columns filled by values.

Example 8. The computing system of any of examples 1-7, wherein the processing circuitry is further configured to: determine a second delimiter hypothesis as the respective one of the plurality of second delimiter hypotheses associated with the selected table; and output at least two of the first delimiter, the second delimiter hypothesis, or a child delimiter hypothesis.

Example 9. The computing system of any of examples 1-8, wherein as part of determining the first delimiter, the processing circuitry is configured to determine that the first delimiter is an only potential first delimiter from a plurality of potential first delimiters to appear in the input text block.

Example 10. The computing system of any of example 1-8, wherein as part of determining the first delimiter, the processing circuitry is configured to determine the first delimiter to be a potential first delimiter with a greatest regularity in a number of characters separating the first delimiter from among a plurality of first delimiters or a potential first delimiter having a highest consistency score among the plurality of first delimiters.

Example 11. A method of parsing and transforming input data, the method comprising: determining a first delimiter; determining a plurality of second delimiter hypotheses; parsing the input data according to the first delimiter and the plurality of second delimiter hypotheses to generate a plurality of tables that are each associated with a respective one of the plurality of second delimiter hypotheses; determining a respective consistency score for each of the plurality of tables; selecting a table from among the plurality of tables based on the respective consistency score associated with the table; format the input data based on the selected table to generate formatted data; and outputting the formatted data.

Example 12. The method of example 11, wherein the formatted data comprises payload data labeled according to a column and a row of the table.

Example 13. The method of example 11 or example 12, wherein selecting the table from among the plurality of tables comprises selecting the table having a highest consistency score among the plurality of tables.

Example 14. The method of any of examples 11-13, further comprising: determining a plurality of child delimiter hypotheses for a column or a row of the selected table, the column including column data or the row including row data; parsing the column data or the row data according to each child delimiter hypotheses to generate a plurality of child tables, each of the plurality of child tables associated with a respective one of the plurality of child delimiter hypotheses; determining a respective consistency score for each of the plurality of child delimiter hypotheses; and selecting a child delimiter hypothesis among the plurality of child delimiter hypotheses or no child delimiter hypothesis for the column or the row based on the respective consistency score.

Example 15. The method of example 14, wherein selecting the child delimiter hypothesis from among the plurality of child delimiter hypotheses or no child delimiter hypothesis for the column or the row based on the respective consistency score comprises selecting no child delimiter hypothesis based on each determined respective consistency score for the column or the row being equal to zero.

Example 16. The method of example 14, wherein selecting the child delimiter hypothesis of the plurality of child delimiter hypotheses or no child delimiter hypothesis for the column or the row based on the respective consistency score comprises selecting the child delimiter hypothesis having a highest consistency score among the plurality of child delimiter hypotheses for the column or the row.

Example 17. The method of any of examples 11-16, wherein the first delimiter is a row delimiter, the plurality of second delimiter hypotheses comprise a plurality of column delimiter hypotheses, and wherein determining the respective consistency score comprises determining $$P(x, \theta) = \frac{1}{k}\sum_{k=1}^{k} N_k\left(\frac{M_k}{(M_k+1)}\right) * \left(\frac{M_{col}}{RC_{filled}}\right),$$

where P is a function yielding the consistency score, x is a block of input text, θ is a hypothetical delimiter applied to the input text, k is a total number of unique patterns found while processing for θ, $N_k$ is a total number of tuples, $M_k$ is a total number of delimiters per pattern, $M_{col}$ is a total number of columns created and $RC_{filled}$ is a total number of rows and columns filled by values.

Example 18. The method of any of examples 11-17, wherein determining the first delimiter comprises determining that the first delimiter is an only potential first delimiter from a plurality of potential first delimiters to appear in the input text block.

Example 19. The method of any of examples 11-18, wherein determining the first delimiter comprises determining the first delimiter to be a potential first delimiter with a greatest regularity in a number of characters separating the first delimiter from among a plurality of potential first delimiters or a potential first delimiter having a highest consistency score among the plurality of potential first delimiters.

Example 20. A non-transitory, computer-readable medium comprising instructions for parsing and transforming input data that, when executed, are configured to cause processing circuitry of a computing system to: obtain the input data; determine a first delimiter; determine a plurality of second delimiter hypotheses; parse the input data according to the first delimiter and the plurality of second delimiter hypotheses to generate a plurality of tables that are each associated with a respective one of the plurality of second delimiter hypotheses; determine a respective consistency score for each of the plurality of tables; select a table from among the plurality of tables based on the respective consistency score associated with the table; format the input data based on the selected table to generate formatted data; and output the formatted data.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units or engines is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A computing system comprising:
   one or more processors; and
   one or more memories storing processor-executable instructions that, when executed by the one or more processors, cause the one or more processors to perform operations comprising:
   obtaining input data;
   determining a first delimiter within the input data;
   generating, from the input data and using the first delimiter, an arranged string;
   determining an N most frequent characters in the arranged string, wherein N is greater than one;
   determining a plurality of second delimiter hypotheses, the plurality of second delimiter hypotheses comprising the N most frequent characters in the arranged string, each of the plurality of second delimiter hypotheses comprising a respective potential delimiter to use with the first delimiter;
   parsing the arranged string using each of the plurality of second delimiter hypotheses;
   generating, based on parsing the arranged string using each of the plurality of second delimiter hypotheses, a plurality of tables that are each associated with a respective one of the plurality of second delimiter hypotheses;
   determining a respective consistency score associated with each respective table of the plurality of tables, wherein the respective consistency score is based on at least one of a total number of patterns in the respective table, a total number of tuples in the respective table, a total number of delimiters per pattern in the respective table, a total number of columns or rows in the respective table, or a total number cells defined by the rows and the columns of the respective table filled by values;
   selecting a table from among the plurality of tables based on the respective consistency score associated with the table;
   formatting the input data based on the selected table to generate formatted data; and
   outputting the formatted data.

2. The computing system of claim 1, wherein formatting the input data comprises formatting the input data into payload data labeled according to a column and a row of the selected table.

3. The computing system of claim 1, wherein selecting the table from among the plurality of tables comprises selecting the table having a highest consistency score among the plurality of tables.

4. The computing system of claim 1, wherein the operations further comprise:
   determining a plurality of child delimiter hypotheses within the input data for a column or a row of the selected table, the column including column data or the row including row data, each of the plurality of child delimiter hypotheses comprising a respective potential child delimiter;
   parsing the column data or the row data according to each of the plurality of child delimiter hypotheses;
   generating, based on parsing the column data or the row data, a plurality of child tables, each of the plurality of child tables associated with a respective one of the plurality of child delimiter hypotheses;
   determining a respective child consistency score for each of the plurality of child delimiter hypotheses; and
   selecting a child delimiter hypothesis from among the plurality of child delimiter hypotheses or no child delimiter hypothesis for the column or the row based on the respective child consistency score for each of the plurality of child delimiter hypotheses.

5. The computing system of claim 4, wherein selecting the child delimiter hypothesis from among the plurality of child delimiter hypotheses or no child delimiter hypothesis for the column or the row comprises selecting no child delimiter hypothesis based on the respective child consistency score for each of the plurality of child delimiter hypotheses being equal to zero.

6. The computing system of claim 4, wherein selecting the child delimiter hypothesis from among the plurality of child delimiter hypotheses or no child delimiter hypothesis for the column or the row comprises selecting the child delimiter hypothesis based on the child delimiter hypothesis having a highest consistency score among the respective child consistency score of each of the plurality of child delimiter hypotheses for the column or the row.

7. The computing system of claim 1, wherein the first delimiter comprises a row delimiter, the plurality of second delimiter hypotheses comprises a plurality of column delimiter hypotheses, and wherein determining the respective consistency score comprises determining:

$$P(x, \theta) = \frac{1}{k}\sum_{k=1}^{k} N_k\left(\frac{M_k}{(M_k + 1)}\right) * \left(\frac{M_{col}}{RC_{filled}}\right),$$

where P is a function yielding the respective consistency score, x is a block of input text, $\theta$ is a hypothetical delimiter applied to the input text, k is a total number of unique patterns found while processing for $\theta$, $N_k$ is a total number of tuples, $M_k$ is a total number of delimiters per pattern, $M_{col}$ is a total number of columns created and $RC_{filled}$ is a total number of rows and columns filled by values.

8. The computing system of claim 1, wherein the operations further comprise:
determining a second delimiter hypothesis as a respective one of the plurality of second delimiter hypotheses associated with the selected table; and
outputting at least two of the first delimiter, the second delimiter hypothesis, or a child delimiter hypothesis.

9. The computing system of claim 1, wherein determining the first delimiter comprises determining that the first delimiter comprises an only potential first delimiter from a plurality of potential first delimiters to appear in input text.

10. The computing system of claim 1, wherein determining the first delimiter comprises determining the first delimiter to be a potential first delimiter with a greatest regularity in a number of characters separating the first delimiter from among a plurality of potential first delimiters or a potential first delimiter having a highest consistency score among the plurality of potential first delimiters.

11. A computer-implemented method comprising:
determining, by one or more processors, a first delimiter within input data;
generating, by the one or more processors, from the input data and using the first delimiter, an arranged string;
determining, by the one or more processors, an N most frequent characters in the arranged string, wherein N is greater than one;
determining, by the one or more processors, a plurality of second delimiter hypotheses, the plurality of second delimiter hypotheses comprising the N most frequent characters in the arranged string, each of the plurality of second delimiter hypotheses comprising a respective potential delimiter to use with the first delimiter;
parsing, by the one or more processors, the arranged string using each of the plurality of second delimiter hypotheses;
generating, by the one or more processors, based on parsing the arranged string using each of the plurality of second delimiter hypotheses, a plurality of tables that are each associated with a respective one of the plurality of second delimiter hypotheses;
determining, by the one or more processors, a respective consistency score associated with each respective table of the plurality of tables, wherein the respective consistency score is based on at least one of a total number of patterns in the respective table, a total number of tuples in the respective table, a total number of delimiters per pattern in the respective table, a total number of columns or rows in the respective table, or a total number cells defined by the rows and the columns of the respective table filled by values;
selecting, by the one or more processors, a table from among the plurality of tables based on the respective consistency score associated with the table;
formatting, by the one or more processors, the input data based on the selected table to generate formatted data; and
outputting, by the one or more processors, the formatted data.

12. The computer-implemented method of claim 11, wherein formatting the input data comprises formatting the input data into payload data labeled according to a column and a row of the selected table.

13. The computer-implemented method of claim 11, wherein selecting the table from among the plurality of tables comprises selecting the table having a highest consistency score among the plurality of tables.

14. The computer-implemented method of claim 11, further comprising:
determining, by the one or more processors, a plurality of child delimiter hypotheses within the input data for a column or a row of the selected table, the column including column data or the row including row data, each of the plurality of child delimiter hypotheses comprising a respective potential child delimiter;
parsing, by the one or more processors, the column data or the row data according to each of the plurality of child delimiter hypotheses;
generating, by the one or more processors, based on parsing the column data or the row data, a plurality of child tables, each of the plurality of child tables associated with a respective one of the plurality of child delimiter hypotheses;
determining, by the one or more processors, a respective child consistency score for each of the plurality of child delimiter hypotheses; and
selecting, by the one or more processors, a child delimiter hypothesis from among the plurality of child delimiter hypotheses or no child delimiter hypothesis for the column or the row based on the respective child consistency score for each of the plurality of child delimiter hypotheses.

15. The computer-implemented method of claim 14, wherein selecting the child delimiter hypothesis from among the plurality of child delimiter hypotheses or no child delimiter hypothesis for the column or the row comprises selecting no child delimiter hypothesis based on the respective child consistency score for each of the plurality of child delimiter hypotheses being equal to zero.

16. The computer-implemented method of claim 14, wherein selecting the child delimiter hypothesis from among the plurality of child delimiter hypotheses or no child delimiter hypothesis for the column or the row comprises selecting the child delimiter hypothesis based on the child delimiter hypothesis having a highest consistency score among the repsective child consistency score for each of the plurality of child delimiter hypotheses for the column or the row.

17. The computer-implemented method of claim 11, wherein the first delimiter comprises a row delimiter, the plurality of second delimiter hypotheses comprises a plurality of column delimiter hypotheses, and wherein determining the respective consistency score comprises determining $$P(x, \theta) = \frac{1}{k}\sum_{k=1}^{k} N_k\left(\frac{M_k}{(M_k+1)}\right)*\left(\frac{M_{col}}{RC_{filled}}\right),$$

where P is a function yielding the respective consistency score, x is a block of input text, θ is a hypothetical delimiter applied to the input text, k is a total number of unique patterns found while processing for θ, $N_k$ is a total number of tuples, $M_k$ is a total number of delimiters per pattern, $M_{col}$ is a total number of columns created and $RC_{filled}$ is a total number of rows and columns filled by values.

18. The computer-implemented method of claim 11, wherein determining the first delimiter comprises determining that the first delimiter comprises an only potential first delimiter from a plurality of potential first delimiters to appear in a block of input text.

19. The computer-implemented method of claim 11, wherein determining the first delimiter comprises determining the first delimiter to be a potential first delimiter with a greatest regularity in a number of characters separating the first delimiter from among a plurality of potential first delimiters or a potential first delimiter having a highest consistency score among the plurality of potential first delimiters.

20. One or more non-transitory, computer-readable media storing processor-executable instructions for parsing and transforming input data that, when executed by one or more processors, cause the one or more processors to:
    obtain the input data;
    determine a first delimiter within the input data;
    generate, from the input data and using the first delimiter, an arranged string;
    determine an N most frequent characters in the arranged string, wherein N is greater than one;
    determine a plurality of second delimiter hypotheses, the plurality of second delimiter hypotheses comprising the N most frequent characters in the arranged string, each of the plurality of second delimiter hypotheses comprising a respective potential delimiter to use with the first delimiter;
    parse the arranged string using each of the plurality of second delimiter hypotheses;
    generate, based on parsing the arranged string using each of the plurality of second delimiter hypotheses, a plurality of tables that are each associated with a respective one of the plurality of second delimiter hypotheses;
    determine a respective consistency score associated with each respective table of the plurality of tables, wherein the respective consistency score is based on at least one of a total number of patterns in the respective table, a total number of tuples in the respective table, a total number of delimiters per pattern in the respective table, a total number of columns or rows in the respective table, or a total number cells defined by the rows and the columns of the respective table filled by values;
    select a table from among the plurality of tables based on the respective consistency score associated with the table;
    format the input data based on the selected table to generate formatted data; and
    output the formatted data.

* * * * *